United States Patent [19]

Belke et al.

[11] 4,338,781
[45] Jul. 13, 1982

[54] ROTATING FLUIDIZED BED COMBUSTOR

[75] Inventors: William H. Belke, Peoria; George B. Grim, Washington, both of Ill.

[73] Assignee: Caterpillar Tractor Co., Peoria, Ill.

[21] Appl. No.: 102,199

[22] Filed: Nov. 1, 1979

[51] Int. Cl.³ ............................................. F02C 3/26
[52] U.S. Cl. .............................. 60/39.35; 60/39.46 S
[58] Field of Search ......... 60/39.35, 39.46 S, 39.51 R; 431/7, 170; 432/58; 122/4 D

[56] References Cited

U.S. PATENT DOCUMENTS

| | | | |
|---|---|---|---|
| 3,578,798 | 5/1971 | Lapple | 432/58 |
| 3,716,003 | 2/1973 | Battcock | 122/4 D |
| 4,031,953 | 6/1977 | Kline | 60/39.51 R |
| 4,039,272 | 8/1977 | Elliot | 432/58 |
| 4,080,784 | 3/1978 | Jubb | 60/39.46 S |
| 4,148,186 | 4/1979 | Virr | 60/39.46 S |
| 4,161,103 | 7/1979 | Horgan et al. | |
| 4,177,636 | 12/1979 | Horgan | |
| 4,183,208 | 11/1980 | Horgan et al. | |

OTHER PUBLICATIONS

J. Swithenbank, "Rotating Fluidized Bed Combuster/Gasifier".
Demircan, et al., "Rotating Fluidized Bed Combuster", *Fluidization*, Cambridge University Press (1978), pp. 270–275.
Broughton, et al., "Heat Transfer and Combustion in Centrifugal Fluidized Bed", I. Chem. E. Sympos. Ser. No. 43 (Jun. 1975).

*Primary Examiner*—L. J. Casaregola
*Attorney, Agent, or Firm*—Sixbey, Friedman & Leedom

[57] ABSTRACT

A rotating fluidized bed combustor particularly adaptable for mounting on conventional gas turbine engines comprising an annular fluidized bed, defined by inner and outer spaced apart coaxial, cylindrical, perforated walls, which rotates about the longitudinal axis of the cylinders. Compressed air and solid or liquid fuel enter the bed through the outer perforated wall and fluidize the bed. The air reacts with the fuel within the bed to produce hot combustion gas which exits the bed, together with unreacted compressed air, through the inner perforated wall. When employed with gas turbine engines, the gases exiting the bed are directed into the guide vanes of the gasifier turbine. Cooling tubes pass substantially longitudinally through the rotating fluidized bed and compressed air is directed through the tubes to absorb combustion heat from the bed.

17 Claims, 2 Drawing Figures

ROTATING FLUIDIZED BED COMBUSTOR

DESCRIPTION

1. Technical Field

The present invention relates to fluidized bed combustor systems and, more particularly, to rotating fluidized bed combustor systems especially useful in gas turbine engines.

2. Background Art

In recent years fluidized beds have found many diverse uses in power generating systems and chemical processes. They have served as chemical reactors, particularly for finely divided materials; as incinerators for liquid, solid or gaseous substances; as pressurized or atmospheric, coal-, lignite-, petroleum-, peat-, wood- and/or paper-fired boiler or combustor units for power generation; and, as sites for various process treatments such as drying, baking, coating, oxidizing, etc.

Typically, fluidized beds which are in use today are static beds established when air or other fluidizing gas is introduced into a plenum chamber under pressure and forced upwardly through a diffusing medium (e.g., membrane, grate) to a superimposed chamber containing a particulate bed, of inert or reactive, finely divided, pulverulent solid material. Gas, forced upwardly through the diffusing medium into the fluidizing chamber under a sufficient predetermined pressure, fluidizes the particulates. The gas pressure required to accomplish this is determined, in part, by the nature and degree of fineness of the particulates to be fluidized. Other influencing factors are the depth of the bed and the size, number and design of the plenum chamber compartments and passages into the superimposed fluidizing chamber.

The energy density in an exothermic gas-solid interaction, such as takes place when a solid fuel is combusted in an air fluidized bed, depends to a major extent on the rate at which the reactants are brought together and the rate at which the combustion products and heat of combustion are removed. In conventional static fluidized beds, by and large, the rate at which the fluidizing air can be blown through the bed is limited by the fact that the fluidizing currents within the fluidized zone are vertical, i.e., only the gravity force on the bed particles opposes the balancing air force needed to maintain fluidization. If the force opposing the balancing air force could be increased, then the fluidizing air force could be correspondingly increased, and the air flow rate through the bed and the energy density of the system would be increased. This can be accomplished using rotating fluidizing beds wherein the fluidizing air forced through the bed from its periphery opposes the centrifugal force tending to throw the bed particles outwardly from the bed axis of rotation toward the bed periphery. The extent of the centrifugal force and, thus, of the opposing fluidizing air flow rate can be controlled by controlling the speed of bed rotation. As a result of increasing the energy density, rotating fluidizing beds used as combustors, e.g., as turbine combustors, occupy only about two-thirds the volume of conventional combustors. In some applications where size is critical this can be a considerable advantage, especially when the combustor burns fuels which inherently require large volumes, such as powdered coal.

The use of a rotating fluidized bed combustor in a gas turbine engine offers significant net owning and operating cost advantages when compared to present gas turbine engines. The principal advantage of a rotating fluidized bed combustor over a static fluidized bed combustor is the reduced volume necesQary to produce a specified power level, i.e., enhanced energy density. Energy densities in the range of 200 megawatts per cubic meter, two or three times that of conventional turbine combustors, can be obwained in rotating fluidized bed units. Rotating fluidized bed combustors also exhibit improved chemical reaction rate and better combustion, both of which contribute to more effective control of undesirable emissions. This is mainly attributable to the rapid diffusion of reactants and rapid removal of chemical reaction products attainable in rotating fluidized beds where the mixing results in a homogeneous bed which has better combustion and emission control. Furthermore, rotating fluidized bed combustors have a multi-fuel capability, being capable of burning gaseous fuels, solid fuels or very viscous fuels which cannot be atomized in conventional combustors. Indeed, a fluidized bed can be used for oxidizing almost any material that has an exothermic reaction.

A form of rotating fluidized bed combustor system is disclosed by J. Swithenbank in his article "Rotating Fluidized Bed Combustor/Gasifier". The Swithenbank system includes a vertical shaft around which rotates a generally cylindrical combustor using natural gas as the fuel. The gas is introduced at the center of the combustor, i.e., along the axis of rotation, and is mixed with fluidizing air forced through the bed particles from the bed periphery toward the center. The bed, which is heated by the combustion heat generated and the mixing action accompanying rotation, preheats the entering fluidizing air. Most of the combustion between the heated air and the natural gas appears to occur outside, rather than within, the bed itself. Cooling coils passing through the bed carry air which is heated by the combustion and serve to control the bed and exhaust gas temperature. Swithenbank states that his combustion system may be operated by burning or gasifying coal granules in the fluidized bed, but discloses no combustor configuration suitable for use with coal fuels. Moreover, Swithenbank's configuration, requiring introduction of the fuel along the axis of rotation, detracts from the attainment of maximum energy density because it diminishes the compactness of the system. See also, Demircan et al, *Rotating Fluidized Bed Combustor*, published in "Fluidization" by Cambridge University Press (1978). Other publications of interest in connection with the heat transfer and combustion characteristics of natural gas fueled rotating fluidized beds are J. Broughton and G. E. Elliott, *Heat Transfer and Combustion in Centrifugal Fluidized Bed*, I. Chem E. Symposium Series No. 43 (paper presented at June, 1975 meeting) and G. C. Lindauer et al, *Experimental Studies on High Gravity Rotating Fluidized Bed*, U.S. Atomic Energy Commission, BNL-50013 (September 1966). In view of the foregoing, there is a need to provide an alternative to the known prior art.

DISCLOSURE OF INVENTION

In one aspect of the present invention this is accomplished by providing a rotating fluidized bed combustor including a fluidization chamber in which a gaseous fluidizing agent and a combustible fuel react as they move in the same direction through a bed of pulverulent solid particles fluidized by the gaseous agent in the chamber. The gaseous combustion products and unreacted gaseous agent exit the chamber and are directed away therefrom.

In another aspect of the invention, the chamber includes first and second spaced apart apertured or perforated walls, means are provided for rotating the chamber about an axis to cause the bed particles to centrifugally gravitate toward the first perforated wall, the gaseous agent and combustible fuel are fed into the chamber through the first perforated wall and the combustion products and unreacted gaseous agent exit the chamber through the second perforated wall.

In a particularly preferred form of the invention, the first and second walls are substantially cylindrical and comprise the outer and inner coaxial walls, respectively, of the fluidization chamber. As the chamber is rotated about its axis, the bed particles centrifugally gravitate toward the outer wall. Compressed air, the preferred gaseous agent, enters the chamber through the outer perforated wall and fluidizes the bed particles. Generally, the fuel is fed to the fluidized bed with the fluidizing air stream, particularly if the fuel is solid, such as powdered coal. The fluidized air, heated by the bed which is already hot from prior combustion, reacts with the fuel to form hot combustion gases and the unreacted fluidizing air exits the fluidized bed with the hot combustion gases through the perforated inner wall.

In an especially useful application, the rotating fluidized bed combustor of the present invention is employed as the combustor in a conventional gas turbine engine. The hot combustion gases and unreacted fluidizing air exiting the fluidization chamber are directed into the guide vanes of the gasifier turbine, then through the conventional gas turbine engine path which includes a power turbine assembly and recuperator section.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BEST MODE FOR CARRYING OUT THE INVENTION

Figure 1:
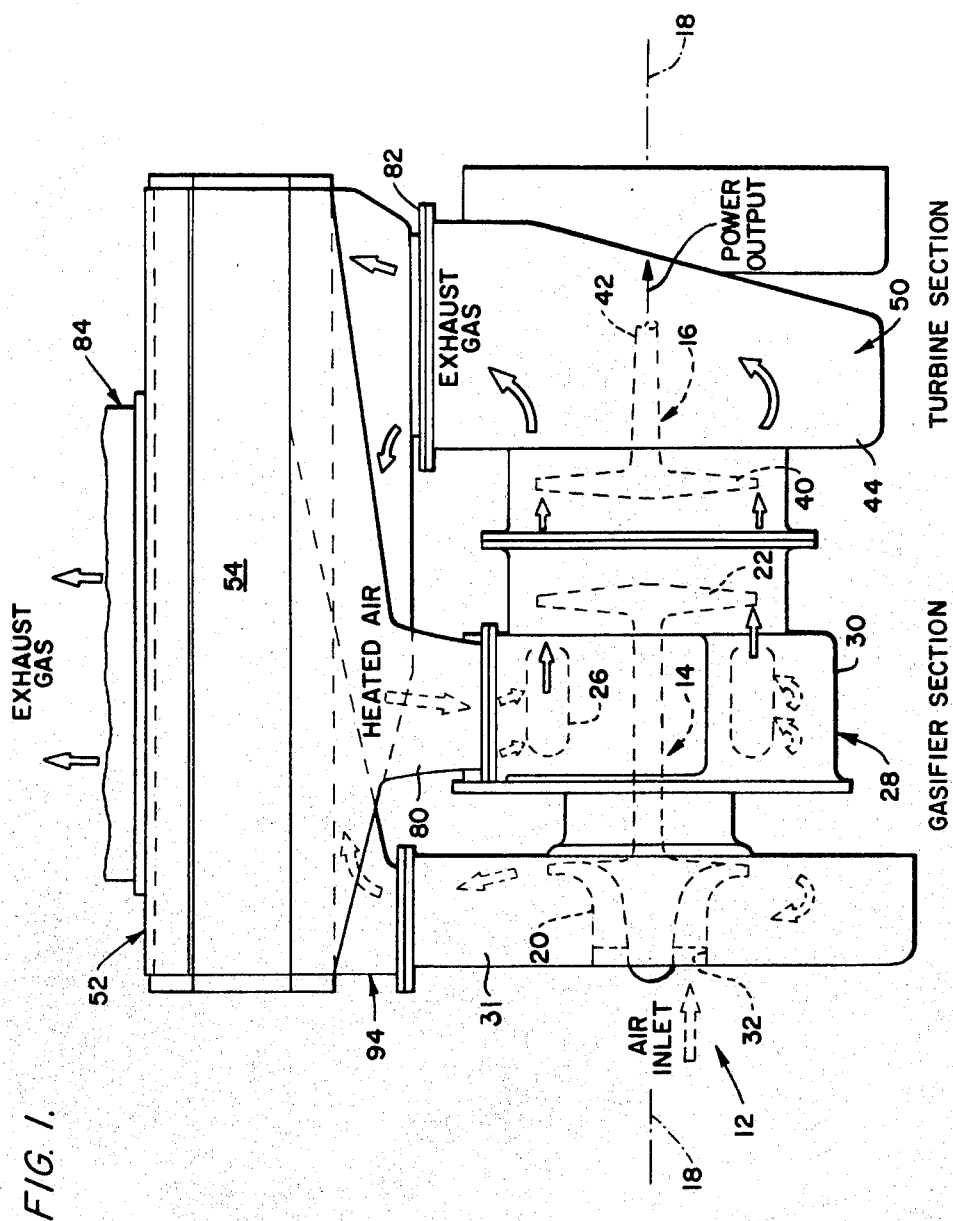
FIG. 1 is a side elevational schematic view of a conventional gas turbine engine showing the use of the rotating fluidized bed combustor system of the present invention in connection therewith.

The rotating fluidized bed combustor system of the present invention has wide utility wherever combustors may be used but is particularly adaptable for mounting on a gas turbine engine generally within the area usually occupied by conventional gas turbine combustors. With reference to FIG. 1 the fluidized bed combustor system of the present invention is shown intimately mounted within and supported by an otherwise conventional gas turbine engine 12. The gasifier section 28 of engine 12 includes a rotatable front shaft assembly 14 having a compressor 20 and an integrally associated gasifier turbine 22 for driving the compressor. Combustors 26, which each conventionally might comprise a fuel injector and combustion chamber, but in connection with the present invention comprise rotating fluidized bed combustors, are mounted for rotation about the central longitudinal axis 18 of the gas turbine engine. A gasifier section housing 30, including a front air inlet opening 32, directs the air and gases therethrough and supportably contains the front shaft assembly 14. The turbine section 50 of engine 12 includes a rotatable rear shaft assembly 16 aligned with the front shaft assembly along central longitudinal axis 18. Rear shaft assembly 16 has a power turbine 40 and an integrally associated output shaft 42 which drives a suitable load. A rear housing 44 supportably contains the rear shaft assembly 16 and provides hot gas inlet and exhaust gas outlet openings. A recuperator section 52, including at least one heat exchanger unit 54, is supportably mounted on front housing 30 and rear housing 44 and provides a hot exhaust gas inlet 82, a cooled exhaust gas outlet 84 and appropriate ducting, including an air inlet duct 94 and a heated air outlet duct 80, to channel the flow of inlet air from the compressor 20 through the heat exchanger unit in a predetermined flowpath over the heat exchange surfaces therein. The air is heated while passing in heat exchange relation with the hot exhaust gases, which also pass through the heat exchanger unit along a predetermined flowpath over the heat exchange surfaces therein, and is directed into the combustors 26 for use as the fluidizing and combustion air, as will be discussed more fully hereinafter.

The foregoing will be further amplified by the following brief summary of operation wherein the flow path of the relatively hot engine exhaust gas is indicated on FIG. 1 by solid arrows, while the flow path of the relatively cooler air is indicated by broken line arrows.

Referring to FIG. 1, the gasifier section 28 of the gas turbine engine 12 cooperates with the turbine section 50 and recuperator section 52 in the following manner. With rotation of the front shaft assembly 14 the compressor 20 draws air axially through the inlet opening 32 into the housing 31 and discharges pressurized and somewhat heated air into the recuperator section air inlet duct 94. The compressed air enters the heat exchanger unit or units 54 where it is heated as it travels along a defined flow path over the heat exchange surfaces therein. After being heated the air passes out of the heat exchanger unit and is directed through outlet duct 80 into the front housing 30 where it is led to the rotating fluidized bed combustors 36.

Fuel, either solid or liquid, is fed to combustors 26 and the beneficially heated and compressed air serves to fluidize the bed and enhance combustion. The subsequent gaseous products of combustion (shown as solid arrows) are allowed to flow axially rightwardly when viewing FIG. 1 to impinge on and to powerably drive the gasifier turbine 22. Thus, the combustor exhaust gas serves to initially rotate the gasifier turbine to drive the integrally associated compressor 20. Thereafter, the exhaust gas travels further rightwardly from within the front housing 30 to the rear housing 44 where it impinges on and powerably drives the power turbine 40 which subsequently delivers useful power to any applied load via the output shaft 42. The exhaust gas from the power turbine 40 can be effectively utilized to heat air, or even liquids, through an associated exhaust heat exchanger system. In the conventional gas turbine engine, the gas travels generally upwardly through the recuperator section 54 to transfer its heat to the inlet air. Specifically, the exhaust gas provides useful energy recovery by passing upwardly from within the rear housing 44 through recuperator section exhaust gas inlet 82 and through appropriate ducting into the heat exchanger unit 54 where it is cooled as it travels along a defined flow path over the heat exchange surfaces and gives up its heat to the inlet air (which preferably flows counter-currently thereto). The cooled exhaust gas is delivered through exhaust gas outlets 84 to the atmosphere.

Figure 2:
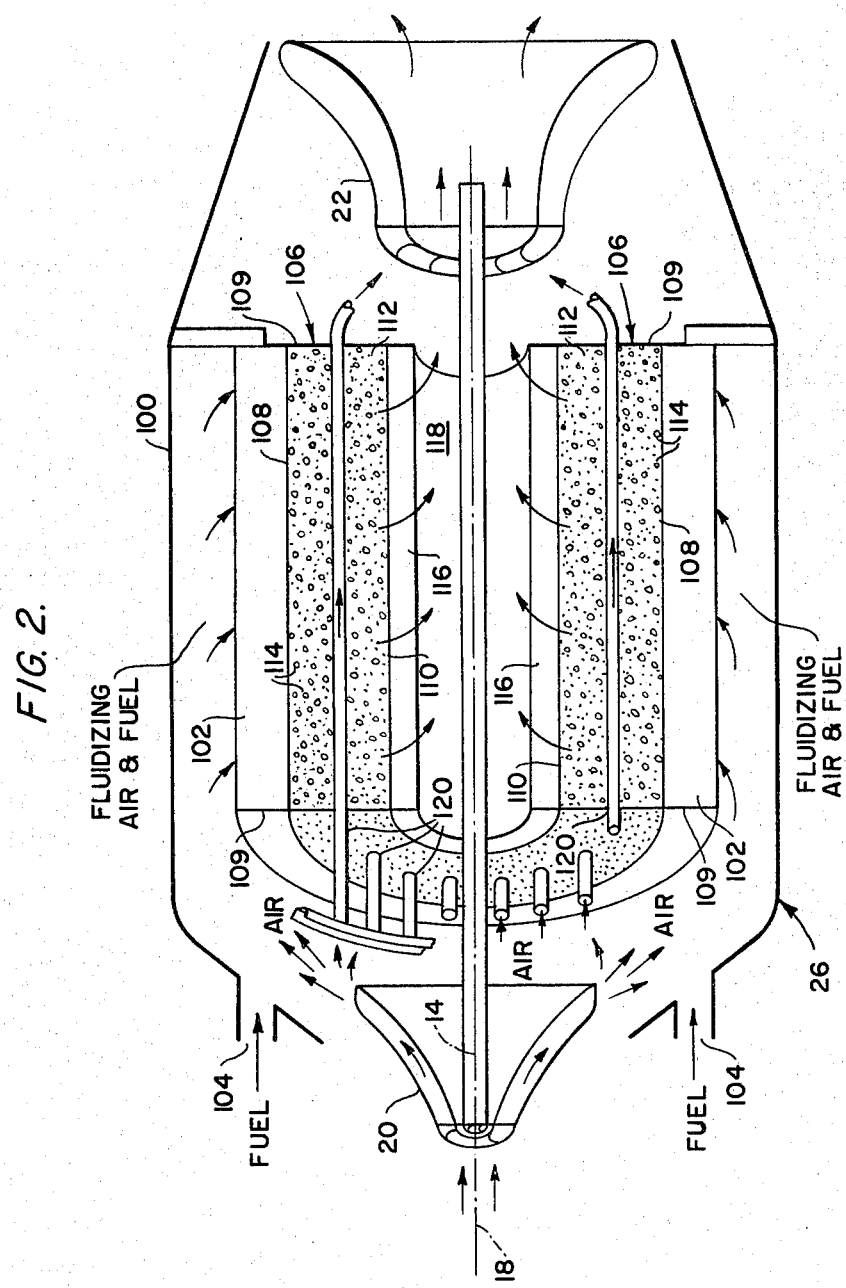
FIG. 2 is a schematically simplified sectional view of one embodiment of the fluidized bed combustor system of the present invention.

Referring now to FIG. 2 a preferred form of rotating fluidized bed combustor 26 of the present invention is more clearly depicted. As can be seen in detail the combustor 26 includes a housing 100 through which passes a rotatable shaft assembly. Compressed air is ducted within housing 100 into inlet plenum chamber 102. The compressed air may be preheated air, such as exits the recuperator section of a gas turbine engine (see FIG. 1). Fuel fed through entry port 104 is mixed with the compressed air prior to entering the inlet plenum chamber and is conveyed by the air to the fluidized rotating bed portion 106 of the combustor. In a preferred embodiment the fuel is powdered coal, desirably solvent refined coal to minimize ash removal problems. Alternatively, the fuel may be a liquid which can be suitably injected into the compressed air stream through port 104.

The fluidized bed portion 106 comprises an outer perforated cylindrical wall 108, an inner perforated cylindrical wall 110 and appropriate enclosing walls 109 defining therebetween an annular fluidizing chamber 112 in which pulverulent solid particles 114 are disposed. The perforations in walls 108 and 110 are small enough to contain particles 114 within chamber 112 and to control the exhaust of solid combustion products but large enough to permit the entry of powdered fuel and to sustain the free flow of fluidizing air from the inlet plenum chamber 102 through wall 108, into and through chamber 112, through wall 110 and into outlet plenum chamber 116. The fluidized bed portion 106 rotates on the axis of the rotatable shaft assembly which, in the case of the gas turbine engine shown in FIG. 1, is horizontal shaft assembly 14 by independent motor drive or by appropriate gearing to drives for other conventional gas turbine engine functions. It will be appreciated that the bed could be rotated about a horizontal axis, as shown, about a vertical axis or, if advantageous within the particular configuration employed, about any desired axis. Rotation is controlled to a speed sufficient to impart a centrifugal force to the particles 114 within the bed. The centrifugal force causes the particles 114 to gravitate away from axis 18 toward outer peripheral wall 108. The flow of fluidizing air from inlet plenum chamber 102 through perforated outer wall 108 opposes the centrifugally induced movement of the particles 114 and, in so doing, fluidizes the bed. Combustion occurs within the fluidizing chamber 112 between the fluidizing air and the fuel, e.g., powdered coal, to produce hot combustion gases within the bed. These hot combustion gases are swept out of the bed through inner perforated wall 110 by the flow of fluidizing air through the bed. The unreacted fluidizing air and the hot combustion gases pass from outlet plenum chamber 116 into the core 118 of the combustor 26. In the preferred embodiment illustrated in FIG. 2, where the combustor 26 of the present invention is used in connection with a conventional gas turbine engine, core 118 is an elongated cylindrical chamber which directs the flow of unreacted fluidizing air and combustion gases through the vanes or blades of gasifier turbine 22. As shown in FIG. 1, the hot exhaust gases from gasifier turbine 22 are ducted to and through the vanes or blades of power turbine 40 to produce useful engine work output via shaft 42.

The bed particles 114 are preferably either inert materials, e.g., sand, etc. and/or a sulfur absorber, e.g., dolomite, etc. Alternatively, the bed particles may be any other inert material generally found suitable for use in fluidized beds. If desired, a portion of the fluidized bed may be solid fuel, such as powdered coal, admixed with inert materials, such as a particulate mixture of coal, dolomite, sand and coal ash. A generally useful proportion of bed particles is 95% inert materials, 5% fuel. As the combustion proceeds, whether the fuel is a particulate component of the original bed or is carried into the bed with the fluidizing air, coal ash is formed and becomes either a part of the inert particulate portion of the bed or passes out of the bed through the inner perforated wall 110 with the unreacted fluidizing air and combustion gases. Any ash which passes out of the bed may be removed from the gas stream by a cyclone separator, not shown. Ash and sulfur remaining in the bed will eventually have to be circulated to a cleaning and reclaiming device, not shown. If solvent refined coal is used, ash and sulfur removal is generally not a problem as this will permit operation for lengthy periods without any interruption.

The combustion temperature within the bed is controlled in part by the ratio of air to fuel fed into the bed. In addition, combustion temperature may be controlled by controlling the amount of heat transfer to cooling tubes (or coils) 120 which pass substantially longitudinally through the bed. The tubes 120 may, if desired, rotate with the bed portion 106 and are supplied with air from compressor portion 20 within housing 100. By pre-determining the rate of flow of air through the tubes and the number of tubes carrying air through the bed, localized temperatures within the bed are readily controlled. It is recommended to control the temperature of the bed to about 900° C. This minimizes fusion of the ash constituent of the bed and prevents formation of "glassy" particles which can cause turbine blade erosion if they escape through the inner perforated wall of the fluidized bed. The heated air exhausting tubes 120 may be directed, as shown in FIG. 2, into admixture with the unreacted fluidizing air and combustion gases from core 118 and directed through the vanes of gasifier turbine 22. In this manner, the temperature and flow volume of gases passing through turbine 22 can be controlled.

INDUSTRIAL APPLICABILITY

The rotating fluidized bed combustor of the present invention has broad applicability but is particularly useful as the combustor in conventional gas turbine engines. When operating in this capacity the fluidized bed portion 106 preferably rotates about the main compressor and turbine axis and rotation is motivated by suitable gearing to other conventional engine functions. Upon rotation of the front shaft assembly 14, the compressor 20 draws air into inlet opening 32, compresses the air, and directs the air flow into heat-exchanger unit or units 54 through recuperator section inlet duct 94. The compressed air follows a defined flow path within the heat exchanger and is heated by the hot power turbine exhaust gas which also follows a defined, but different, flow path within the heat exchanger. The heated compressed air is directed via recuperator section outlet duct 80 into housing 100 of combustors 26.

Powdered coal fuel is fed through entry port 104 into the heated compressed air stream and is conveyed with the stream via inlet plenum chamber 102 through perforated outer wall 108 into fluidization chamber 112. Inasmuch as the rotation of fluidized bed portion 106 causes the particles 114 within chamber 112 to gravitate toward outer wall 108, the opposing flow of the compressed air stream into the chamber 112 fluidizes the particles. Combustion occurs within fluidizing chamber 112 between the compressed air and the powdered coal fuel to produce hot combustion gases within the bed. These hot combustion gases are swept out of the bed together with unreacted fluidizing compressed air through inner perforated wall 110 by the flow of fluidizing compressed air through the bed. The unreacted compressed air and the hot combustion gases pass through outlet plenum chamber 116 into core 118 of combustor 26 and are directed through the vanes of gasifier turbine 22 to drive it and, through shaft 14, to drive compressor 20 as well. The exhaust gas from gasifier turbine 22 is directed through the vanes of the power turbine 40 which delivers useful output work via output shaft 42. The exhaust gas from the power turbine is then ducted into the heat exchanger 54 to serve as the heating medium for the inlet compressed air. After the exhaust gas gives up its thermal energy and is cooled in the heat exchanger 54 it is ducted through exhaust gas outlets 84 to the atmosphere. Temperatures within the bed portion 106 are controlled and the volume of gas flowing through the turbines 22 and 40 is supplemented by directing compressed air from compressor 20 through cooling tubes 120 which extend longitudinally through bed portion 106.

It is anticipated that further aspects of the present invention can be obtained from the foregoing description and the appended claims.

We claim:

1. A rotatable fluidized bed combustor (26) for exothermically reacting a gaseous agent and a fuel comprising:
    a. an outer, substantially cylindrical, elongated perforated wall (108);
    b. an inner, substantially cylindrical, perforated wall (110) spaced apart and substantially co-axial and co-extensive with said outer perforated wall (108);
    c. enclosing walls (109) defining with said outer and inner perforated walls (108,110) a substantially cylindrical annular fluidization chamber (112);
    d. a fluidizable bed of pulverulent solid particles (114) in said chamber (112);
    e. means (14) for rotating said chamber (112) about the axis (18) to cause the particles to centrifugally gravitate toward said outer perforated wall (108);
    f. means (102) for feeding a combustible fuel in a gaseous agent stream into said chamber (112) through said outer perforated wall (108), said gaseous agent having flow characteristics suitable for fluidizing said particles in said chamber (112), said fuel reacting with at least a portion of said gaseous agent in said chamber (112) to form gaseous combustion products, said unreacted gaseous agent and said gaseous combustion products exiting said chamber (112) through said inner perforated wall (110);
    g. means (116) for receiving said gaseous combustion products and unreacted gaseous agent exiting from said chamber (112) through said inner perforated wall (110); and
    h. means (118), communicating with said means (116) for receiving, for directing said unreacted gaseous agent and said gaseous combustion products exiting said inner perforated wall (110) away from said chamber (112).

2. A combustor, as claimed in claim 1, wherein said combustible fuel is a powdered solid fuel.

3. A combustor, as claimed in claim 1, wherein said axis of rotation is coincident with the longitudinal axis (18) of said substantially cylindrical walls (108, 110).

4. A combustor, as claimed in claim 3, wherein the substantially cylindrical space enclosed by said inner perforated wall (110) comprises said means (116) for receiving and means (118) for directing said unreacted gaseous agent and said gaseous combustion products away from said chamber (112).

5. A combustor, as claimed in claim 3, including at least one tube (120) extending substantially longitudinally through said chamber (112) for passing a gaseous heat exchange fluid therethrough.

6. A combustor, as claimed in claim 5, wherein said at least one tube (120) directs the heat exchange fluid exiting therefrom into admixture with said unreacted gaseous agent and gaseous combustion products.

7. In a gas turbine engine (12) including a compressor (20), a combustor (26), a gasifier turbine (22), a first shaft (14) mounting said compressor (20) adjacent a first end thereof and said gasifier turbine (22) adjacent the other end thereof, said turbine (22) having blades positioned in the path of exhaust gases exiting said combustor (26) to drive said first shaft (14) and said compressor (20), a power turbine (40) having blades positioned in the path of exhaust gases exiting said gasifier turbine (22), a second shaft (42) driven by said power turbine (40) for delivering output work, a heat exchanger (54) for receiving compressed gas from said compressor (20), heating said compressed gas therein and passing said heated compressed gas to said combustor (26) and for receiving exhaust gases from said power turbine (40), cooling said exhaust gases while transferring at least a portion of their heat to said compressed gas and exhausting the resulting cooled exhaust gases, the improvement comprising:
    a rotatable fluidized bed combustor (26) for exothermically reacting said heated compressed gas and a fuel, said combustor comprising:
    a. an outer, substantially cylindrical, perforated wall (108);
    b. an inner, substantially cylindrical, perforated wall (110) spaced apart and substantially coaxial and co-extensive with said outer perforated wall (108);
    c. enclosing walls (109) defining with said outer and inner perforated walls (108,110) a substantially cylindrical annular fluidization chamber (112);
    d. a fluidizable bed of pulverulent solid particles (114) in said chamber (112);
    e. means (14) for rotating said chamber (112) about the axis (18) to cause the particles to centrifugally gravitate toward said outer perforated wall (108);
    f. means (102) for feeding a combustible fuel in said heated, compressed gas into said chamber (112) through said outer perforated wall (108), said heated, compressed gas having flow characteristics suitable for fluidizing said particles in said chamber (112), said fuel reacting with at least a portion of said heated, compressed gas in said chamber (112) to form gaseous combustion products, said unreacted compressed gas and said gaseous combustion products exiting said chamber (112) through said inner perforated wall (110);

g. means (116) for receiving said gaseous combustion products and unreacted compressed gas exiting from said chamber (112) through said inner perforated wall (110); and h. means (118), communicating with said means (116) for receiving, for directing said unreacted compressed gas and said gaseous combustion products exiting said inner perforated wall (110) to said gasifier turbine (22).

8. A gas turbine engine, as claimed in claim 7 wherein said combustible fuel is a powdered solid fuel.

9. A gas turbine engine, as claimed in claim 7 wherein said axis of rotation is coincident with the longitudinal axis (18) of said substantially cylindrical walls (108, 110).

10. A gas turbine engine, as claimed in claim 7, wherein said axis of rotation is substantially coextensive with said first shaft (14).

11. A gas turbine engine, as claimed in claim 9, wherein the substantially cylindrical space enclosed by said inner perforated wall (110) comprises said means (116) for receiving and means (118) for directing said unreacted compressed gas and said gaseous combustion products to said gasifier turbine (22).

12. A gas turbine engine, as claimed in claim 9, including at least one tube (120) extending substantially longitudinally through said chamber (112) for passing a gaseous heat exchange fluid therethrough.

13. A gas turbine engine as claimed in claim 12, wherein said at least one tube (120) directs the heat exchange fluid exiting therefrom into admixture with said unreacted compressed gas and gaseous combustion products.

14. A rotatable fluidized bed combustor (26) for exothermically reacting a gaseous agent and a fuel comprising:

a. an outer, substantially cylindrical, elongated perforated wall (108);

b. an inner, substantially cylindrical, perforated wall (110) spaced apart and substantially co-axial and co-extensive with said outer perforated wall (108);

c. enclosing walls (109) defining with said outer and inner perforated walls (108,110) a substantially cylindrical annular fluidization chamber (112), said chamber adapted to be mounted for rotation about a vertical axis;

d. a fluidizable bed of pulverulent solid particles (114) in said chamber (112);

e. means (14) for rotating said chamber (112) about the axis (18) to cause the particles to centrifugally gravitate toward said outer perforated wall (108);

f. means (102) for feeding a combustible fuel in a gaseous agent stream into said chamber (112) through said outer perforated wall (108), said gaseous agent having flow characteristics suitable for fluidizing said particles in said chamber (112), said fuel reacting with at least a portion of said gaseous agent in said chamber (112) to form gaseous combustion products, said unreacted gaseous agent and said gaseous combustion products exiting said chamber (112) through said inner perforated wall (110);

g. means (116) for receiving said gaseous combustion products and unreacted gaseous agent exiting from said chamber (112) through said inner perforated wall (110); and h. means (118), communicating with said means (116) for receiving, for directing said unreacted gaseous agent and said gaseous combustion products exiting said inner perforated wall (110) away from said chamber (112).

15. In a gas turbine engine (12) including a compressor (20), a combustor (26), a gasifier turbine (22), a first shaft (14) mounting said compressor (20) adjacent a first end thereof and said gasifier turbine (22) adjacent the other end thereof, said turbine (22) having blades positioned in the path of exhaust gases exiting said combustor (26) to drive said first shaft (14) and said compressor (20), a power turbine (40) having blades positioned in the path of exhaust gases exiting said gasifier turbine (22), a second shaft (42) driven by said power turbine (40) for delivering output work, a heat exchanger (54) for receiving compressed gas from said compressor (20), heating said compressed gas therein and passing said heated compressed gas to said combustor (26) and for receiving exhaust gases from said power turbine (40), cooling said exhaust gases while transferring at least a portion of their heat to said compressed gas and exhausting the resulting cooled exhaust gases, the improvement comprising:

a rotatable fluidized bed combustor (26) for exothermically reacting said heated compressed gas and a fuel, said combustor comprising:

a. an outer, substantially cylindrical, elongated perforated wall (108);

b. an inner, substantially cylindrical, perforated wall (110) spaced apart and substantially coaxial and coextensive with said outer perforated wall (108);

c. enclosing walls (109) defining with said outer and inner perforated walls (108,110) a substantially cylindrical annular fluidization chamber (112), said chamber adapted to be mounted for rotation about a vertical axis;

d. a fluidizable bed of pulverulent solid particles (114) in said chamber (112);

e. means (14) for rotating said chamber (112) about the axis (18) to cause the particles to centrifugally gravitate toward said outer perforated wall (108);

f. means (102) for feeding a combustible fuel in said heated, compressed gas into said chamber (112) through said outer perforated wall (108), said heated, compressed gas having flow characteristics suitable for fluidizing said particles in said chamber (112), said fuel reacting with at least a portion of said heated, compressed gas in said chamber (112) to form gaseous combustion products, said unreacted compressed gas and said gaseous combustion products exiting said chamber (112) through said inner perforated wall (110);

g. means (116) for receiving said gaseous combustion products and unreacted compressed gas exiting from said chamber (114) through said inner perforated wall (110); and h. means (118), communicating with said means (116) for receiving, for directing said unreacted compressed gas and said gaseous combustion products exiting said inner perforated wall (110) to said gasifier turbine (22).

16. A combustor, as claimed in claims 1, 14 or 5, wherein said bed comprises predominantly inert pulverulent solid particles.

17. A gas turbine engine, as claimed in claims 9, 15 or 12, wherein said bed comprises predominantly inert pulverulent solid particles.

* * * * *